(12) United States Patent
Kobayashi et al.

(10) Patent No.: US 7,587,420 B2
(45) Date of Patent: Sep. 8, 2009

(54) SYSTEM AND METHOD FOR QUESTION ANSWERING DOCUMENT RETRIEVAL

(75) Inventors: Kenji Kobayashi, Tokyo (JP); Daisuke Matsui, Akishima (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 43 days.

(21) Appl. No.: 10/572,458

(22) PCT Filed: Oct. 22, 2004

(86) PCT No.: PCT/JP2004/015719

§ 371 (c)(1),
(2), (4) Date: Nov. 17, 2006

(87) PCT Pub. No.: WO2005/041068

PCT Pub. Date: May 6, 2005

(65) Prior Publication Data

US 2007/0073683 A1   Mar. 29, 2007

(30) Foreign Application Priority Data

Oct. 24, 2003   (JP)   ............... 2003-364949

(51) Int. Cl.
*G06F 17/00* (2006.01)
(52) U.S. Cl. .................... 707/104.1; 707/101; 707/102; 707/103 R
(58) Field of Classification Search ............... 707/1–10, 707/100–104.1, 200–206
See application file for complete search history.

(56) References Cited

U.S. PATENT DOCUMENTS

2002/0198875 A1*   12/2002   Masters .................. 707/4

FOREIGN PATENT DOCUMENTS

| JP | 4-281566 | 10/1992 |
| JP | 08-255172 | 10/1996 |
| JP | 2002-132811 | 5/2002 |

OTHER PUBLICATIONS

International Preliminary Report on Patentability and Written Opinion issued by the International Bureau of WIPO for International Application No. PCT/JP2004-015719.
Notification of Reasons for Rejection issued by the Japanese Patent Office on Mar. 7, 2006, for Japanese Patent Application No. 2003-364949, and English-language translation thereof.

* cited by examiner

*Primary Examiner*—Isaac M Woo
(74) *Attorney, Agent, or Firm*—Finnegan, Henderson, Farabow, Garrett & Dunner, L.L.P.

(57) ABSTRACT

A retrieval device (22) retrieves associated documents on the basis of a keyword contained in a question serving as a retrieval request in question form from a user. The retrieval device (22) extracts descriptions associated with the keyword and contained in the retrieved documents as first summaries. A summary extraction unit (232) extracts descriptions corresponding to answers matching the question type of the question determined by a question type determination unit (231) as second summaries from original-document data which forms documents indicated by the document retrieval results. The original-document data is included in original-document data stored in an original-document database and forming each document as a retrieval target. An interface (21) displays the document retrieval results and the list of the extracted second summaries on a display device. The document retrieval results include the list of the extracted first summaries.

7 Claims, 7 Drawing Sheets

SYSTEM AND METHOD FOR QUESTION ANSWERING DOCUMENT RETRIEVAL

TECHNICAL FIELD

The present invention relates to a system and method for question answering document retrieval suitable for analyzing the semantic role (SR) of a question as a retrieval request in question form from a user, extracting descriptions as answers to the question from documents, and presenting the extracted descriptions to the user through a display window.

BACKGROUND ART

Conventionally, various kinds of document retrieval systems which retrieve documents in accordance with a retrieval request from a user have been developed. As a document retrieval system of this type, a document retrieval system which retrieves documents on a word basis by using a full text search technique or a morphological analysis technique is known. However, an enormous number of documents and an enormous amount of document data may satisfy one retrieval request. In such a case, the user needs to check the contents of each of the enormous number of retrieved documents on the display window and select a necessary document from them or extract necessary information. Recently, therefore, there has been developed a user interface which displays a list of summaries (or abstracts) of retrieved documents, in addition to the titles, creators, and the like of the respective retrieved documents, to save the labor of the user. In this case, as a summary, a sentence containing a keyword in a retrieved document, which is designated by the user, the first sentence of the retrieved document, or the like is generally used.

However, the determination as to whether the summary of each document displayed is necessary for a user is influenced by differences in viewpoint between the users or individual differences. The following document retrieval technique is therefore disclosed in Jpn. Pat. Appln. KOKAI Publication No. 8-255172 (reference 1). According to the document retrieval technique disclosed in reference 1, a sentence or information is extracted as an excerpt (excerpt data) from document data (original-document data) constituting each of many documents as retrieval targets. In this case, excerpt data is extracted in advance from the original-document data of each document stored in an original-document database on the basis of various viewpoints or references, which are called sentence patterns, for each sentence pattern. The excerpt data extracted for each sentence pattern are stored in a database (excerpt database) on a document basis. Of the excerpt data extracted from the document data of the retrieved documents, a list of excerpt data matching a sentence pattern selected by the user is displayed. According to such a document retrieval technique, excerpts (summaries) which are highly likely to be required by the user can be displayed.

Jpn. Pat. Appln. KOKAI Publication No. 2002-132811 (reference 2) discloses the following question answering document retrieval technique. According to the document retrieval technique disclosed in reference 2, a retrieval system (question answering document retrieval system) is provided with a retrieval request in question form from a user. Such a retrieval request in question form is a retrieval request in a natural language like, for example, "What is the price of XXX?" or "Who is the president of the YYY company?", i.e., a question. In this case, a retrieval word set and a question classification are determined from a question. An associated document set is then retrieved from a document set on the basis of the retrieval word set and the question classification. Answers (words) to the question are extracted from the associated document set. Pairs of the extracted answers and documents (or the document numbers of the documents) containing the answers are presented, as answer results for the question, to the user by the retrieval system.

DISCLOSURE OF INVENTION

According to the document retrieval technique (to be referred to as the first document retrieval technique hereinafter) disclosed in reference 1, of excerpt data extracted from the document data of retrieved documents, a list of excerpt data matching a sentence pattern selected by a user is displayed. This makes it possible to display excerpts (summaries) which are highly likely to be required by the user, thereby reducing the work load required for document retrieval by the user. In the first document retrieval technique, however, excerpt data used as an excerpt (summary) is extracted in advance, for each sentence pattern, from the original-document data of each document stored in an original-document database. For this reason, the first document retrieval technique cannot cope with addition/change of a sentence pattern.

According to the question answering document retrieval technique (to be referred to as the second document retrieval technique hereinafter) disclosed in patent reference 2, direct answers to a question (a retrieval request in a natural language) and documents on which the answers are based are presented to the user. The user can therefore check the reliability of the answers. In the second document retrieval technique, there is no need to prepare data to be used as answers in advance. This makes it possible to easily cope with addition/change of a question classification. In the second document retrieval technique, however, if questions comprise only keywords and a question classification cannot be determined because of the ambiguity of a question, answer results (retrieval results) cannot be presented to the user.

It is an object of the present invention to present, to a user, a list of the first summaries extracted from documents retrieved by the keyword retrieval technique using a keyword extracted from a question and a list of the second summaries corresponding to answers to the question which are extracted from the retrieved documents by using the question answering document retrieval technique.

According to an aspect of the present invention, there is provided a question answering document retrieval system which executes document retrieval in accordance with a retrieval request in question form. This system comprises retrieval means for retrieving associated documents on the basis of a keyword extracted from a question serving as a retrieval request in question form, extracting descriptions associated with the keyword and contained in the retrieved documents as first summaries, and acquiring document retrieval results including a list of the extracted first summaries, question type determination means for determining a question type of the question by analyzing a semantic role of the question, summary extraction means for acquiring a list of second summaries by extracting descriptions corresponding to answers matching the question type determined by the question type determination means as the second summaries from original-document data which forms documents indicated by the document retrieval results, the original-document data being included in original-document data stored in an original-document database and forming each document as a retrieval target, the summary extraction means acquiring a list of the extracted second summaries, and an interface configured to display the document retrieval results including the list of the first summaries acquired by the retrieval means and the list of the second summaries acquired by the summary extraction means as answers to the retrieval request on a display window on a display device of a retrieval request source.

BEST MODE FOR CARRYING OUT THE INVENTION

Figure 1:
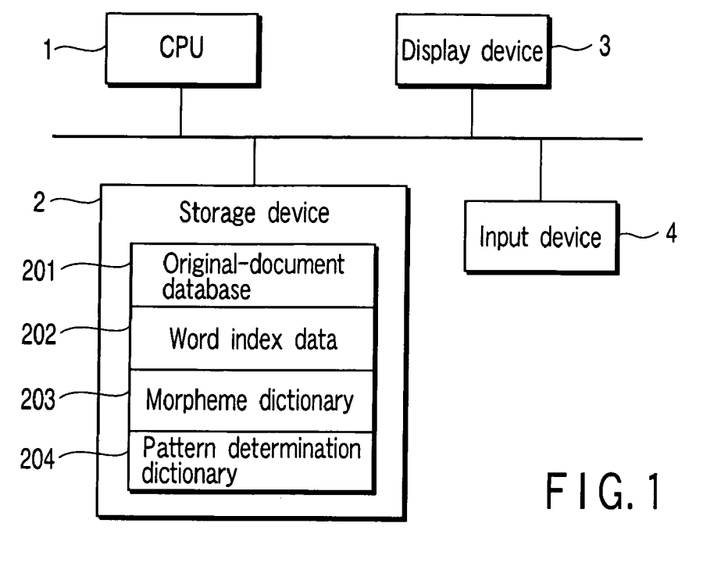
FIG. 1 is a block diagram showing the configuration of a computer system which implements a question answering document retrieval system according to an embodiment of the present invention.

An embodiment of the present invention will be described with reference to the views of the accompanying drawing. FIG. 1 is a block diagram showing the hardware configuration of a computer system which implements a question answering document retrieval system according to an embodiment of the present invention. The computer system shown in FIG. 1 comprises a CPU 1, storage device 2, display device 3, and input device 4. The CPU 1 controls various kinds of processes associated with document retrieval and the overall system. The storage device 2 includes a main memory and a disk drive (e.g., a hard disk drive). A description of how to selectively use the main memory and the disk drive is not directly relevant to the present invention and hence will be omitted. The storage device 2 is used to store various kinds of programs to be executed by the CPU 1. One of these programs is a question answering document retrieval program for implementing question answering document retrieval. Note that the question answering document retrieval program may be one element of one application program instead of an independent program. The storage device 2 is also used to store an original-document database 201, word index data 202, morpheme dictionary 203, and pattern determination dictionary 204.

The original-document database 201 stores original-document data (document data) constituting each of a plurality of documents as retrieval targets. The word index data 202 is index information used to retrieve documents according to keywords. With respect to a word contained in each document as a retrieval target, the word index data 202 indicates a document in which the word is contained and the position of the word in the document. The morpheme dictionary 203 is a dictionary which is used to perform morphological analysis of a question (i.e., a question expressed in a natural language) as a retrieval question in question form. The morpheme dictionary 203 contains, for each morpheme, a pair of the morpheme and part-of-speech information indicating the part of speech of the morpheme. The pattern determination dictionary 204 is used to determine a question pattern (question type) by analyzing the semantic role of a question. The display device 3 includes a display typified by a liquid crystal display and a display controller which controls the display. The display device 3 is used to display an input field for inputting a document retrieval request (e.g., a document retrieval request in question form), a retrieval result corresponding to the retrieval request, and the like. The input device 4 includes a keyboard and a mouse. The input device 4 is used to input a document retrieval request, make various kinds of selections, and the like in accordance with operation by the user.

Figure 2:
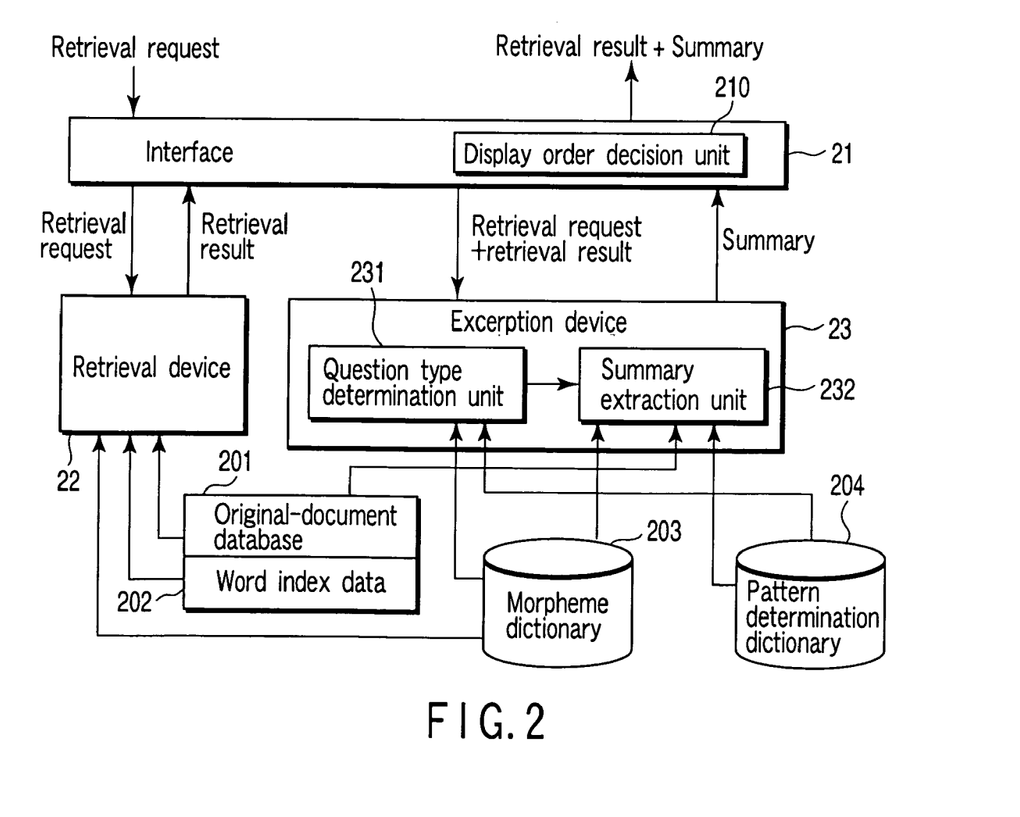
FIG. 2 is a block diagram showing the configuration of the question answering document retrieval system implemented by the computer system in FIG. 1.

FIG. 2 is a block diagram showing the configuration of a question answering document retrieval system implemented by the computer system in FIG. 1. This question answering document retrieval system mainly comprises an interface 21, retrieval device 22, and excerption device 23. The question answering document retrieval system also includes the original-document database 201, word index data 202, morpheme dictionary 203, and pattern determination dictionary 204 shown in FIG. 1. The interface 21, retrieval device 22, and excerption device 23 are implemented when the CPU 1 shown in FIG. 1 executes the question answering document retrieval program. The interface 21 has a function of accepting a retrieval request (a retrieval request in question form in this case) from the user and transferring the retrieval request to the retrieval device 22. This retrieval request is input from the input device 4 shown in FIG. 1 when the user operates the input device 4. The interface 21 also has a function of receiving retrieval results from the retrieval device 22 and transferring the retrieval result and the retrieval request corresponding to the retrieval results to the excerption device 23. The interface 21 further has a function of receiving a list of summaries matching a retrieval request from the excerption device 23 and causing the display device 3 to display the list of summaries, together with the retrieval results from the retrieval device 22, on a retrieval result list window. The interface 21 includes a display order decision unit 210.

The retrieval device 22 has a keyword extraction function of extracting a keyword from a retrieval request in question form transferred from the interface 21. The retrieval device 22 also has a document retrieval function of retrieving documents containing the extracted keyword by using the word index 205. Retrieval using such a keyword will be referred to as keyword retrieval. In this case, a score is assigned to each of the documents retrieved by keyword retrieval on the basis of the frequency of occurrence of the keyword. That is, the score, representing the degree of relevance with respect to the keyword, is calculated. The retrieval device 22 selects upper M (M is an integer greater than one) documents from the documents assigned scores, and transfers retrieval results including a list of the titles and summaries of the selected documents to the interface 21.

The excerption device 23 includes a question type determination unit 231 and a summary extraction unit 232. The question type determination unit 231 determines the question type of a question by analyzing the semantic role of a retrieval request in question form (i.e., the semantic role of the question) transferred from the interface 21 on the basis of the pattern determination dictionary 204. The summary extraction unit 232 specifies a sentence structure unique to the question type determined by the question type determination unit 231 on the basis of the pattern determination dictionary 204. The summary extraction unit 232 extracts a sentence having a specified sentence structure from the original-document data of a maximum of M documents indicated by the retrieval results transferred from the interface 21. The summary extraction unit 232 further assigns a score to each extracted sentence, and selects upper N (N is an integer satisfying N≦M) sentences as summaries matching the question. The selected N summaries are transferred to the interface 21.

Figure 3:
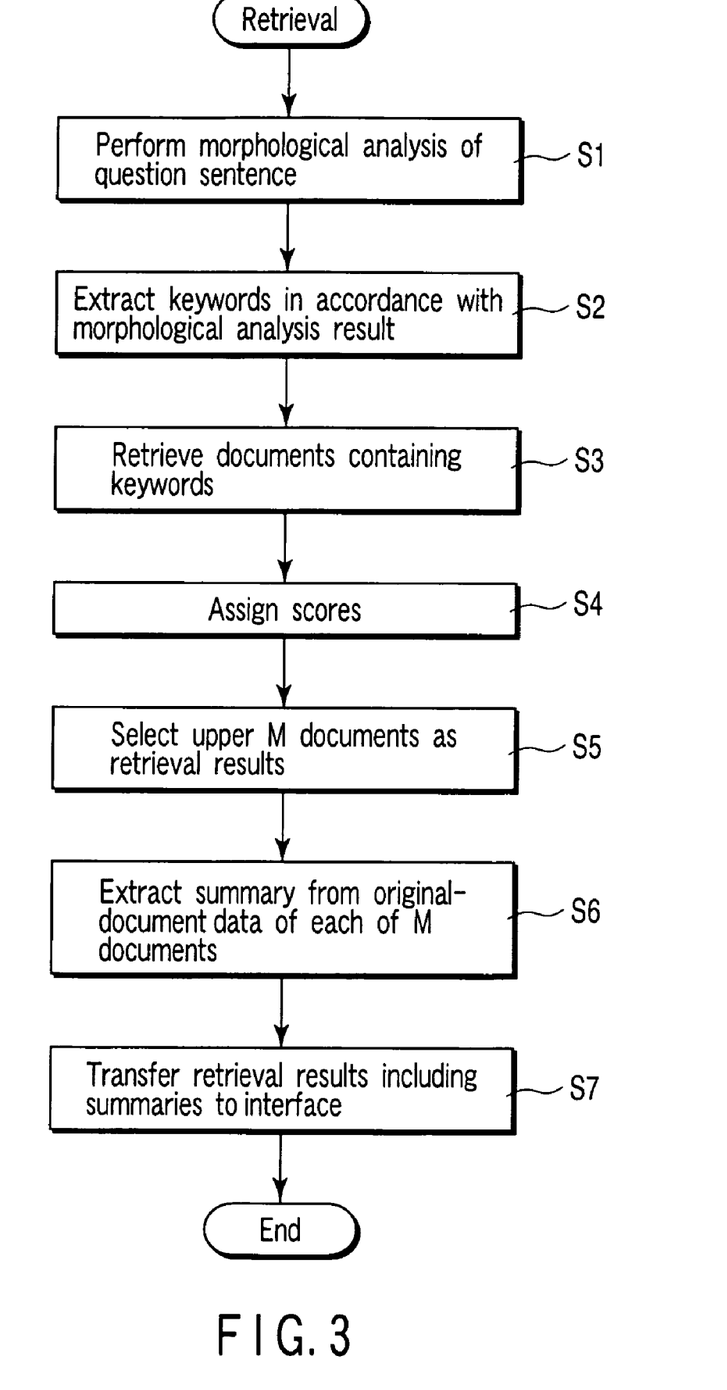
FIG. 3 is a flowchart showing a processing sequence in a retrieval device 22 in the same embodiment.
Figure 4:
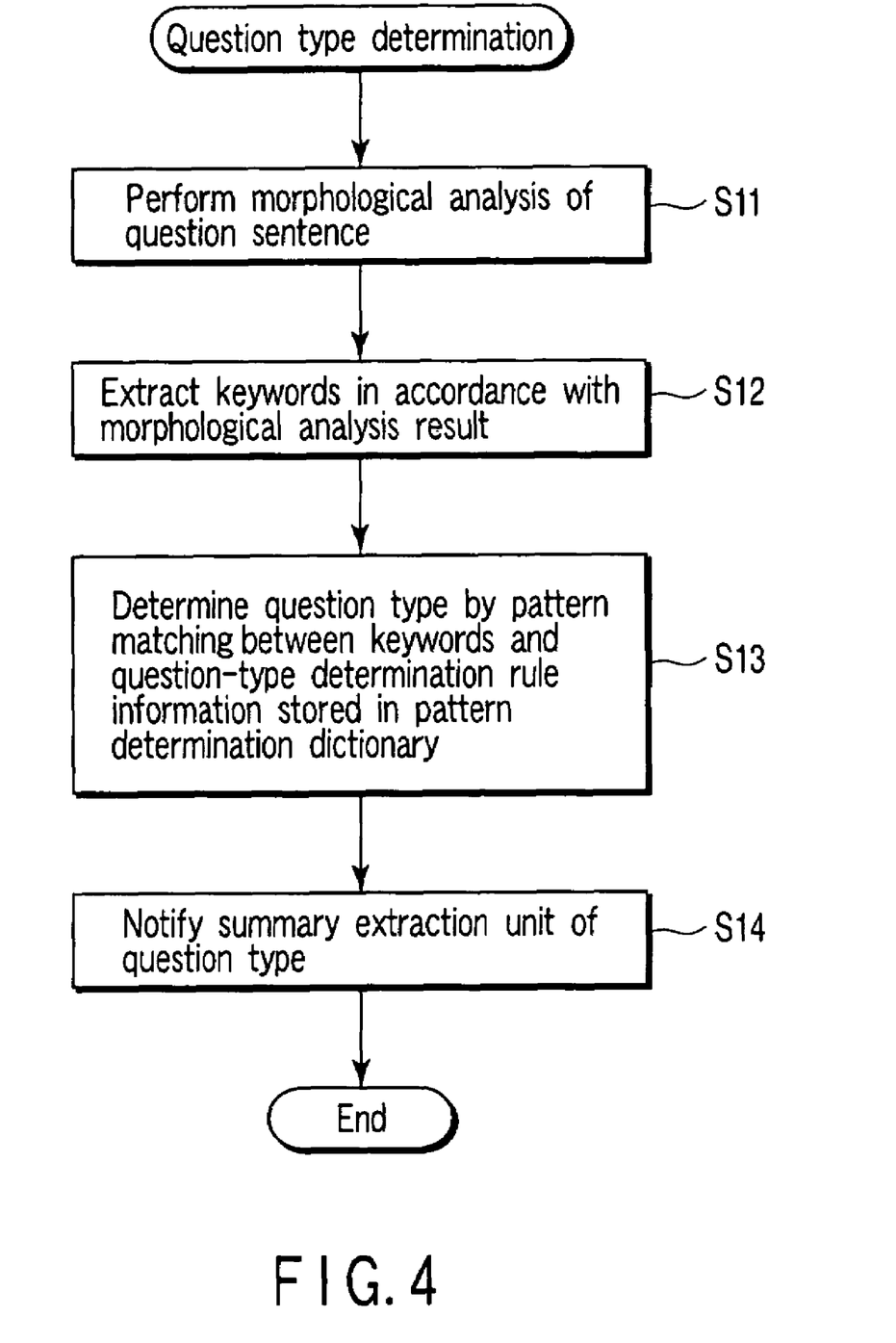
FIG. 4 is a flowchart showing a processing sequence in a question type determination unit 231 in the same embodiment.
Figure 5:
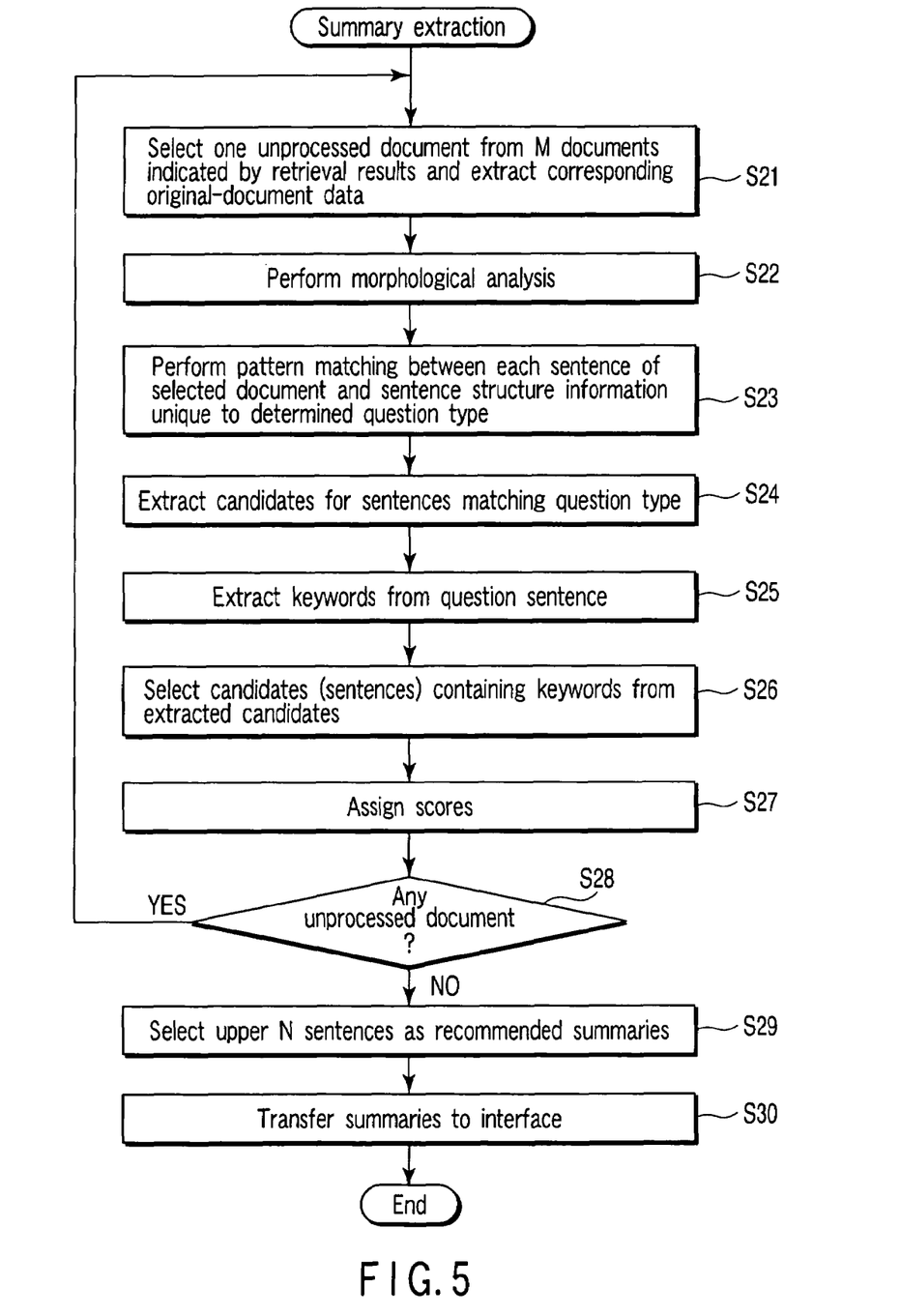
FIG. 5 is a flowchart showing a processing sequence in a summary extraction unit 232 in the same embodiment.
Figure 6:
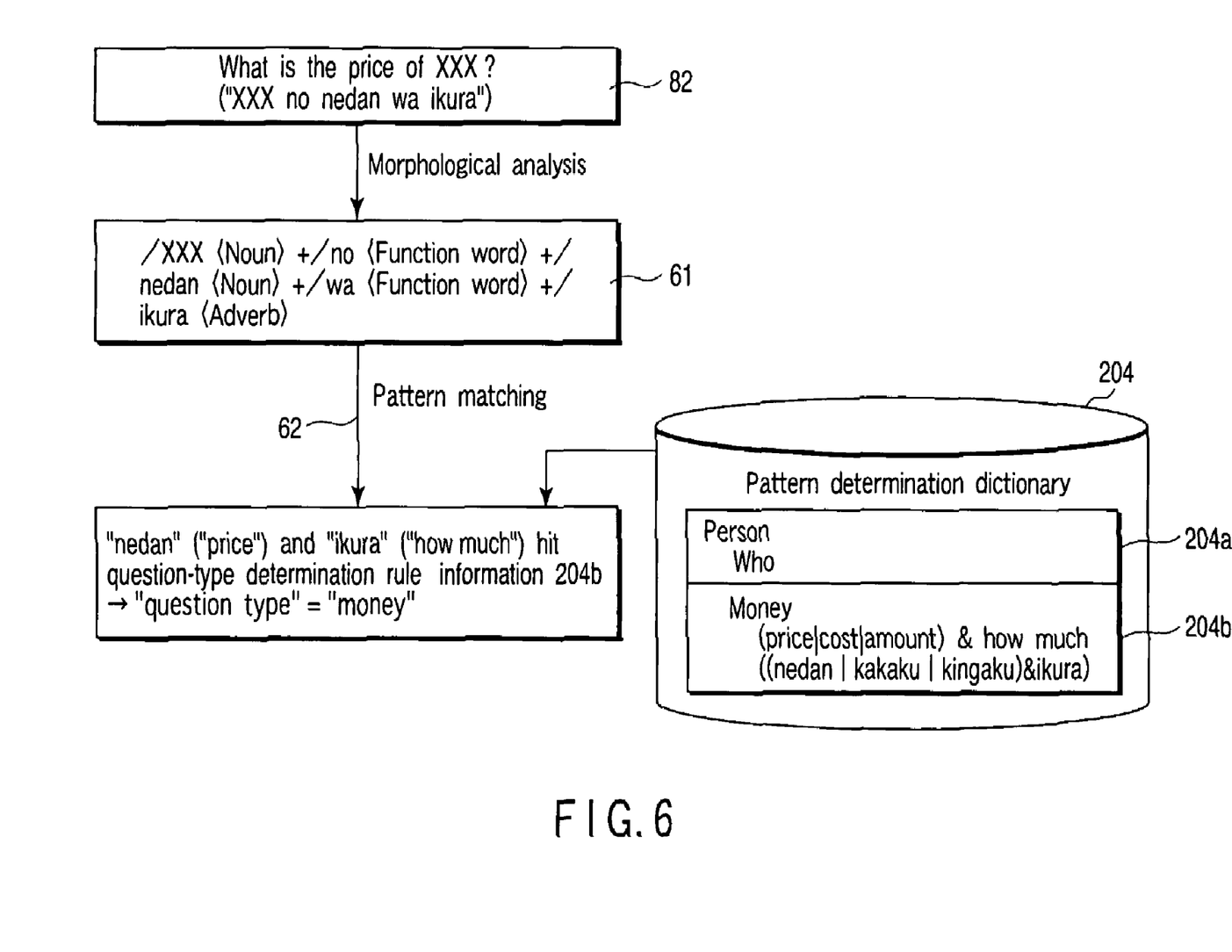
FIG. 6 is a view for explaining question type determination performed by the question type determination unit 231 using a pattern determination dictionary 204.
Figure 7:
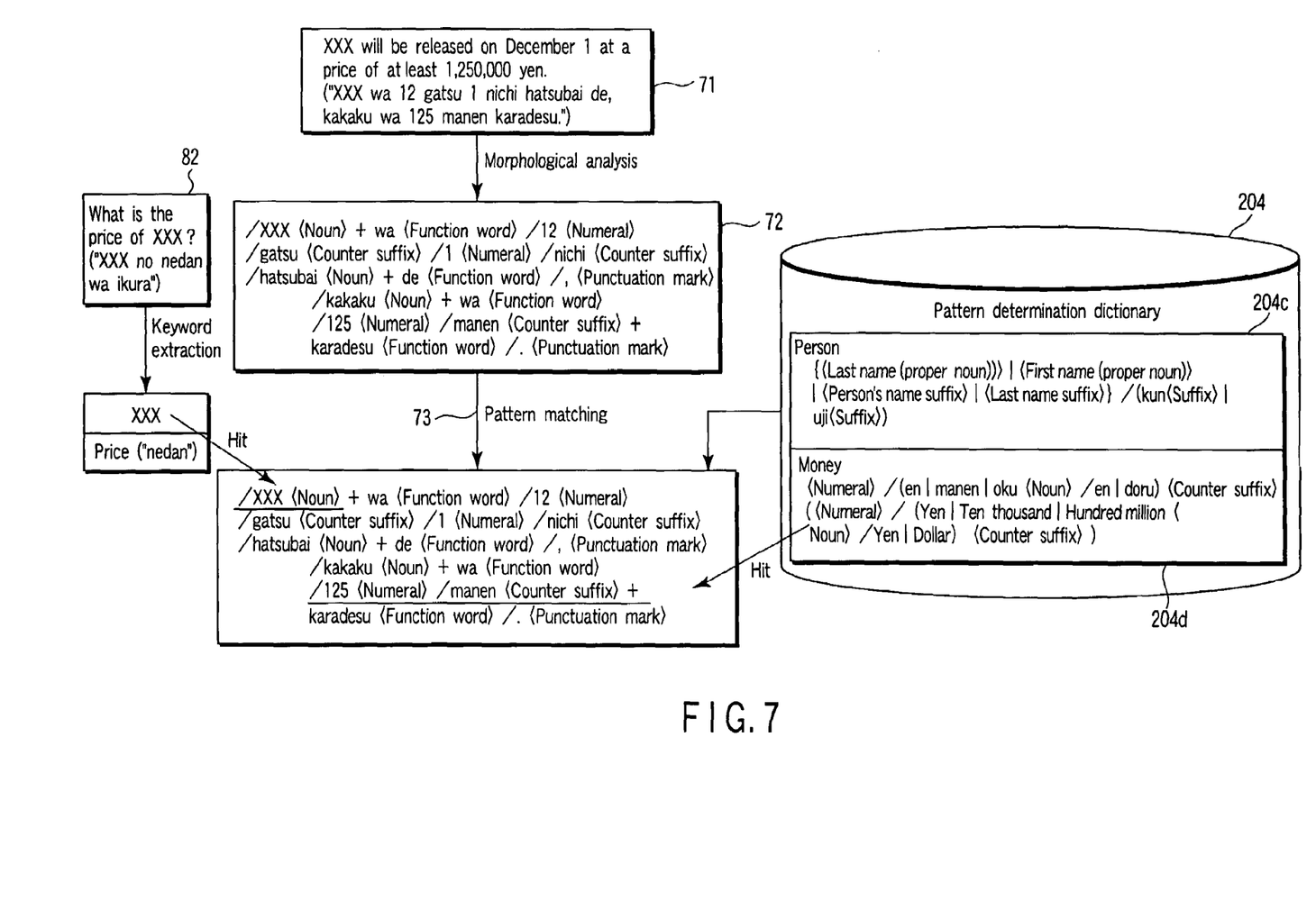
FIG. 7 is a view for explaining summary extraction performed by the summary extraction unit 232 using the pattern determination dictionary 204.
Figure 8:
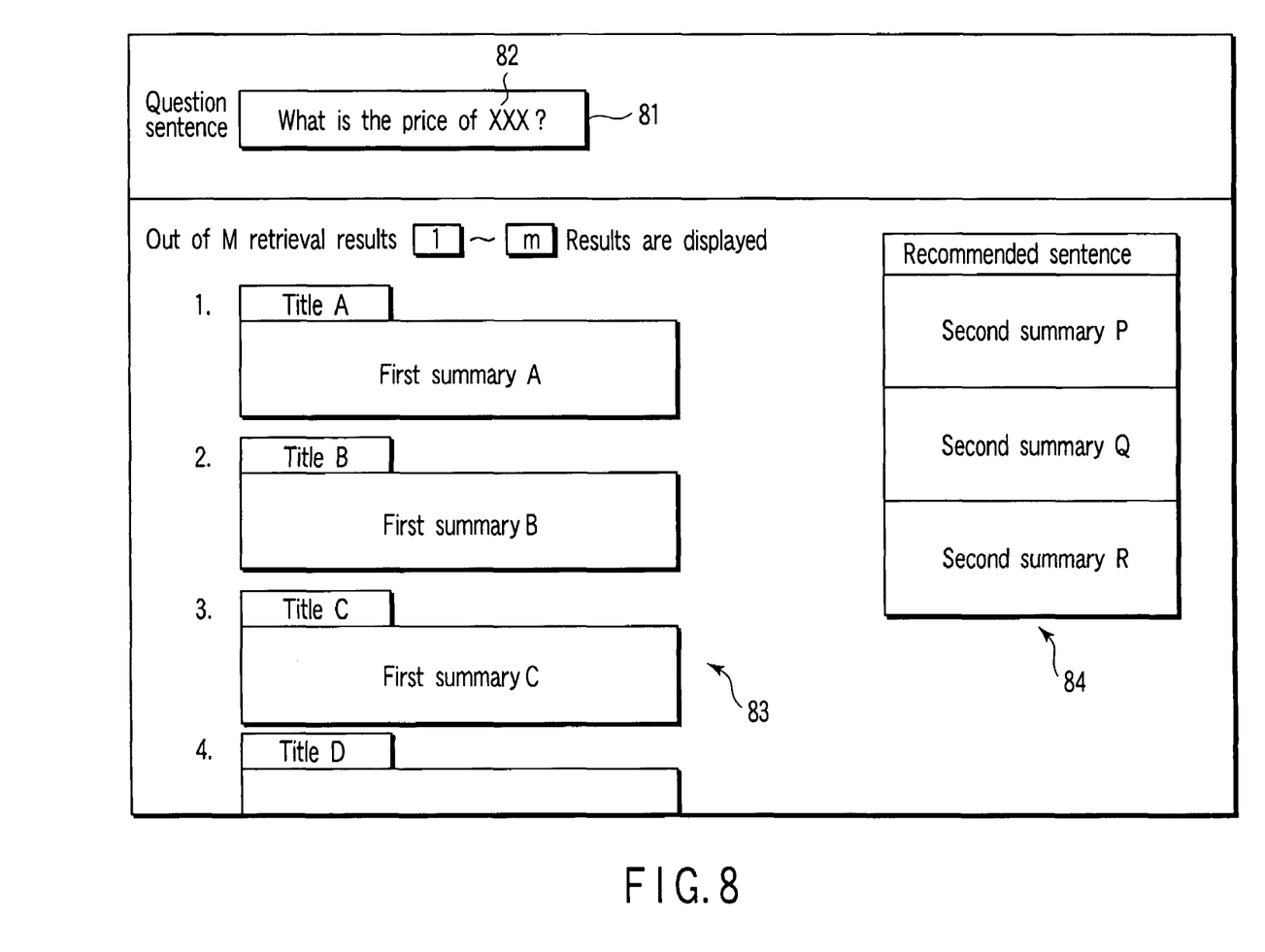
FIG. 8 is a view showing a display window example in the same embodiment.

The operation of this embodiment will be described with reference to FIGS. 3 to 8 by exemplifying the operation to be performed when a retrieval request in question form is input from the input device 4 in accordance with operation by the user. FIG. 3 is a flowchart showing a processing sequence in the retrieval device 22. FIG. 4 is a flowchart showing a processing sequence in the question type determination unit 231. FIG. 5 is a flowchart showing a processing sequence in the summary extraction unit 232. FIG. 6 is a view for explaining question type determination performed by the question type determination unit 231 using the pattern determination dictionary 204. FIG. 7 is a view for explaining summary extraction performed by the summary extraction unit 232 using the pattern determination dictionary 204. FIG. 8 is a view showing a display window example.

Assume that a question input field 81 is displayed on a display window on the display device 3, as shown in FIG. 8. The field 81 is used to input a retrieval request in question form. Assume that the user has performed operation for inputting a question as a retrieval request in question form to the question input field 81. This operation is performed by using the input device 4. Assume that in this case, the user has input a question 82 using natural language for inquiring for "the price of XXX" like "What is the price of XXX?", as shown in FIG. 8. In this case, it is assumed that the question 82, i.e., "What is the price of XXX?", is input in Japanese. FIG. 8 also shows the Romanized Japanese expression "XXX no nedan wa ikura" corresponding to "What is the price of XXX?" as the question 82. The Romanized Japanese words "nedan" and "ikura" mean "price" and "what is the price" ("how much"), respectively. The question 82 input from the input device 4 is transferred as a retrieval request in question form to the interface 21. Upon receiving the retrieval request in question form transferred from the input device 4, the interface 21 transfers the retrieval request to the retrieval device 22.

The retrieval device 22 performs morphological analysis of the retrieval request in question form transferred from the interface 21, i.e., the question 82, on the basis of the morpheme dictionary 203 (step S1). In this case, the question 82, i.e., "XXX no nedan wa ikura" is morphologically analyzed into "/XXX <noun>+/no<function word>+/nedan<noun>+/wa <function word>+/ikura<adverb>". <Noun>, <function word>, and <adverb> in this morphological analysis result indicate that the corresponding morphemes are a noun, function word, and adverb, respectively. The retrieval device 22 then extracts keywords contained in the question on the basis of the morphological analysis result (step S2). In this case, the keywords whose parts of speech are nouns, i.e., "XXX" and "nedan" (i.e., "price"), are extracted.

The retrieval device 22 then performs document retrieval by the so-called keyword retrieval technique to retrieve documents containing the keywords extracted from the question 82 (step S3). The retrieval device 22 retrieves documents containing the keywords by referring to the word index data 202. The document retrieval technique using the word index data 202 has been conventionally known as a technique for quickly retrieving documents containing keywords. Since this technique is not directly relevant to the present invention, a detailed description thereof will be omitted.

The retrieval device 22 then assigns scores to all the retrieved documents (step S4). In this case, a score is assigned to each retrieved document on the basis of the frequency of occurrence of the keywords in the document by using the conventionally known algorithm called "TFIDF". Note that in addition to "TFIDF", various methods of assigning scores to retrieved documents have been known. For example, a score may be prepared in advance for each term serving as a keyword to be assigned to a corresponding retrieved document.

The retrieval device 22 selects M documents having high scores as document retrieval results in descending order of scores from all the retrieved documents on the basis of the scores assigned to all the retrieved documents (step S5). If the number of retrieved documents is less than M, all the retrieved documents are selected. In this case, only documents having scores exceeding a predetermined score can be selected as document retrieval results in descending order of scores.

The retrieval device 22 then extracts a description associated with the above keywords, e.g., a sentence containing the keywords, as a summary (first summary) from each of all the documents (M documents in this case) selected in the order of scores (step S6). The first summary is extracted from each of the M documents selected in the order of the scores by referring to the original-document data forming the documents stored in the original-document database 201. The retrieval device 22 transfers the retrieval result containing the first summary of each of the M documents selected in the order of the scores to the interface 21 (step S7). Upon receiving the retrieval results from the retrieval device 22, the interface 21 transfers the retrieval results, together with the retrieval request in question form, to the excerption device 23.

The question type determination unit 231 of the excerption device 23 then performs morphological analysis of the retrieval request in question form transferred from the interface 21, i.e., the question 82 (step S11). With this operation, as shown in FIG. 6, a morphological analysis result 61 on "XXX no nedan wa ikura" (i.e., "What is the price of XXX?"), which is the question 82, i.e., "/XXX<noun>+/no <function word>+/nedan<noun>+/wa<function word>+/ikura<adverb>" can be obtained. The question type determination unit 231 extracts keywords contained in the question 82 on the basis of the morphological analysis result 61 (step S12). In this case, in addition to the noun "XXX" and the noun "nedan" (i.e., "price"), the adverb "ikura" (i.e., "What is the price" ("How much")) is extracted.

The pattern determination dictionary 204 stores question-type determination rule information, for each predetermined question type, which is a keyword for determining the question type. In this embodiment, as shown in FIG. 6, the pattern determination dictionary 204 stores question-type determination rule information including pieces of question-type determination rule information 204a and 204b. The question-type determination rule information 204a is used to determine a question type associated with a person. The question-type determination rule information 204a includes question type information indicating a question type associated with a person and word information unique to the question type associated with a person, e.g., "who". In this case, if "who" is contained in a set of keywords extracted from the question, the information 204a indicates that the question is of a question type associated with a person. The question-type determination rule information 204b is used to determine a question type associated with money such as a price or cost. The information 204b includes question type information indicating a question type associated with money, and word information unique to the question type associated with money, e.g., "price", "cost", "amount", or "how much". In this embodiment, as the information 204b, Japanese information is used. Referring to FIG. 6, the Romanized Japanese words "nedan" (i.e., "price"), "kakaku" (e.g., "cost"), "kingaku" (i.e., amount"), and "ikura" (i.e., "how much") are written together with "price", "cost", "amount", and "how much" as word information contained in the information 204b. In this case, information 204b includes a determination condition written like "(price|cost|amount) & how much"). In this case, "|" indicates an OR condition, and "&" indicates an AND condition. If at least one of "price", "cost", and "amount" and "how much" are both contained in a set of keywords extracted from the question, the information 204b indicates that the question is of a question type associated with money. "Price", "cost", and "amount" are quasi-synonyms.

As shown in FIG. 6, when step S12 is executed, the question type determination unit 231 performs pattern matching 62 between the keywords extracted from a question and the question-type determination rule information stored in the pattern determination dictionary 204. The question type determination unit 231 analyzes the semantic role of the question by the pattern matching 62, and determines a question type represented by the semantic role (step S13). In this case, "price" and "how much" of the keywords extracted from the question hit "(price|cost|amount) & how much" contained in the question-type determination rule information 204b. In this case, the question type determination unit 231 determines that the question type is "money". The question type determination unit 231 notifies the summary extraction unit 232 in the excerption device 23 of the determined question type (step S14).

The summary extraction unit 232 selects one unprocessed document from the M documents indicated by the retrieval results transferred from the interface 21 to the excerption device 23, and extracts original-document data forming the selected document which is stored in the original-document database 201 (step S21). The summary extraction unit 232 performs morphological analysis of the extracted original-document data on the basis of the morpheme dictionary 203 (step S22). Assume that as shown in FIG. 7, the original-document data includes a sentence 71 of the Romanized Japanese expression "XXX wa 12 gatsu 1 nichi hatsubai de, kakaku wa 125 manen karadesu." (i.e., "XXX will be released on December 1 at a price of at least 1,250,000 yen.") In this case, a morphological analysis result 72 on the sentence 71 is "/XXX<noun>+wa<function word>/12<numeral>/gatsu<counter suffix>/1<numeral>/nichi<counter suffix>/hatsubai <noun>+de<function word>/, <punctuation mark>/kakaku <noun>+wa<function word>/125<numeral>/manen <counter suffix>+karadesu<function word>/. <punctuation mark>".

The pattern determination dictionary 204 stores, for each predetermined question type, sentence structure information indicating the sentence structure of a sentence matching the question type, in addition to the above question-type determination rule information. In this embodiment, as shown in FIG. 7, the pattern determination dictionary 204 stores sentence structure information 204c unique to a question type associated with a person and a sentence structure information 204d unique to a question type associated with money. If the question type is "person", the sentence structure information 204c indicates the Japanese sentence structure "{(<last name (proper noun)>|<first name (proper noun)>|<person's name suffix>|<last name suffix>}/(kun<suffix>|uji <suffix>)" common to recommended sentences (descriptions) matching the question type. In this case, "kun" and "uji" correspond to "Mr." or "Mrs." in English. Note, however, that "kun" or "uji" is placed after "last name (proper noun)", "first name (proper noun)", or the like. In addition, "|" and "/" indicate an OR condition and an AND condition, respectively. With the sentence structure information 204c, a sentence including the sentence structure "{<last name (proper noun)> or <first name (proper noun) or <person's name suffix> or <last name suffix>}+{(kun <suffix>) or (uji<suffix>)}" can be extracted as a sentence matching the question type associated with a person.

If the question type is "money", the sentence structure information 204d indicates the sentence structure "<numeral>/{(en|manen|oku<noun>/en|doru}<counter suffix>" (i.e., "<numeral>/(yen|ten thousand yen|hundred million<noun>/yen|dollar)<counter suffix>") common to recommended sentences (descriptions) matching the question type. In this case, for the sake of convenience, the Romanized Japanese words "en" (i.e., "yen"), "manen" (i.e., "ten thousand yen"), "oku" (i.e., "hundred million"), and "doru" (i.e., "dollar") are used for some of the sentence structure information 204d. With the sentence structure information 204d, a sentence including the sentence structure "numeral+(yen or ten thousand yen or (hundred million+noun+yen) or dollar)+counter suffix" can be extracted as a sentence matching the question type associated with money.

The summary extraction unit 232 performs morphological analysis of each sentence of the original-document data extracted in step S21 (i.e., each sentence of the documents retrieved by the retrieval device 22) (step S22). The flow then advances to step S23. In step S23, the summary extraction unit 232 performs pattern matching 73 between each sentence extracted in step S21 and the sentence structure information unique to the question type determined by the question type determination unit 231 on the basis of the morphological analysis result 72 obtained in step S22 (step S23). In this case, the summary extraction unit 232 performs the pattern matching 73 between each sentence extracted in step S21 and the sentence structure information 204d of the sentence structure information for each question type stored in the pattern determination dictionary 204. With the pattern matching 73, the summary extraction unit 232 extracts a matched sentence as a candidate for a sentence matching the question type (i.e., a sentence matching the semantic role of the question) (step S24). In this case, as shown in FIG. 7, since "1,250,000 yen" of the sentence 71 "XXX will be released on December 1 at a price of at least 1,250,000 yen." hits the sentence structure indicated by the sentence structure information 204d, the sentence 71 is extracted as a candidate for a sentence matching the question type. The summary extraction unit 232 then extracts, for example, nouns as keywords from the question 82 (step S25). The summary extraction unit 232 selects a candidate containing the keywords extracted in step S25 from the candidate (sentence 71) extracted in step S24 (step S26). In this case, "XXX" and "price" are extracted as keywords from the question 82 "What is the price of XXX?". "XXX" is contained in the sentence 71 described above ("XXX will be released on December 1 at a price of at least 1,250,000 yen.") In step S25, therefore, the sentence 71 "XXX will be released on December 1 at a price of at least 1,250,000 yen." is selected. In this manner, the summary extraction unit 232 selects, from the sentences of the document retrieved by the retrieval device 22, a sentence including a sentence structure unique to the question type of the question and containing the keywords extracted from the question (steps S23 to S26). Note that "cost" and "amount" quasi-synonymous to "price" extracted as a keyword from the question can also be used as keywords. Such quasi-synonyms are contained in the question-type determination rule information 204b associated with money. The information 204b is stored in the pattern determination dictionary 204.

The summary extraction unit 232 assigns a score to the selected sentence on the basis of the frequency of occurrence of the keywords as in step S4 (step S27). The summary extraction unit 232 repeats steps S21 to S27 for the M documents indicated by retrieval results (step S28). The summary extraction unit 232 selects upper N (N is an integer satisfying N≦M) sentences from the sentences (candidates) assigned scores as recommended summaries (second summaries) matching the question in, for example, descending order of scores (step S29). If the number of sentences assigned scores is less than N, all the sentences assigned scores are selected. In this case, only sentences assigned scores exceeding a predetermined score can be selected in descending order of scores. The summary extraction unit 232 transfers, to the interface 21, summaries (upper N second summaries) selected in the order of the scores (step S30).

The interface 21 causes the display controller of the display device 3 to display the retrieval results transferred previously from the retrieval device 22 and the second summaries transferred from the summary extraction unit 232 on a display window on the display device 3. In this case, as shown in FIG. 8, the retrieval results transferred from the retrieval device 22, i.e., the retrieval results including a list of the first summaries of the respective documents selected in the order of the scores, are displayed in a first area 83 on the display window. In addition, the second summaries transferred from the summary extraction unit 232, i.e., a list of the second summaries selected in the order of the scores, are displayed in a second area 84 on the display window.

When the retrieval results including the list of the first summaries are to be displayed, the display order decision unit 210 of the interface 21 decides the display order of the first summaries. This display order is decided according to the order of the scores on the basis of the scores calculated when the associated documents are retrieved by the retrieval device 22. The interface 21 displays the list of the first summaries in the first area 83 on the display window in the decided display order (i.e., the order of the scores). Likewise, when the list of the second summaries is to be displayed, the display order decision unit 210 decides the display order of the second summaries. This display order is decided according to the order of the scores on the basis of the scores calculated when the second summaries are extracted by the summary extraction unit 232. The interface 21 displays the list of the second summaries in the second area 84 on the display window in the decided display order (i.e., the order of the scores). In this case, if the entire list of the first or second summaries cannot be displayed at once, the list is divisionally displayed. In this case, the first or second summaries corresponding to a group having the highest score are displayed first. When the user instructs to switch summaries to be displayed, the current display is switched to the display of the first or second summaries corresponding to a group having the next highest score.

Note that if the retrieval device 22 is configured to transfer the list of the first summaries (and titles), in which the first summaries (and titles) are arranged in the order of the scores, to the interface 21, the display order decision unit 210 can decide the display order of the first summaries (and titles) according to the order of the scores without regarding the scores. Likewise, if the summary extraction unit 232 is configured to transfer the list of the second summaries, in which the second summaries are arranged in the order of the scores, to the interface 21, the display order decision unit 210 can decide the display order of the second summaries according to the order of the scores without regarding the scores.

As described above, in this embodiment, documents are retrieved by the keyword retrieval method using keywords extracted from a question as a retrieval request in question form input to the question input field 81. The first summary as a description associated with the keywords is extracted from each of the upper M documents of the retrieved documents. The extracted first summaries are displayed in the first area 83 on the display window in the order of the scores. A description corresponding to an answer matching the question type is extracted from each of the M documents. This question type is determined by analyzing the semantic role of the question by using the question answering retrieval technique. The upper N descriptions (sentences) of the descriptions extracted from the M documents described above are extracted as the second summaries corresponding to the answers to the question. The extracted second summaries are displayed in the second area 84 on the display window in the order of the scores.

As described above, in this embodiment, if descriptions corresponding to answers to a question are found as the second summaries by question answering retrieval, a list of the second summaries is explicitly presented to the user. The user can therefore easily access information which they are searching for from the list of the second summaries. In addition, in this embodiment, since question answering retrieval processing is performed for only documents indicated by document retrieval results, a decrease in response speed in question answering retrieval can be suppressed. Furthermore, in this embodiment, lists of two kinds of summaries having different properties, i.e., the list of the first summaries and the list of the second summaries, can be referred to in descending order of scores. This makes it possible to easily access information for which they are searching. In this case, the user can display a document corresponding to a desired summary by performing the operation of selecting the desired summary from the list of the first or second summaries.

Assume that only the list of the second summaries is basically displayed. In this case, only when no second summaries can be found from documents indicated by document retrieval results, descriptions associated with keywords may be extracted as the first summaries from the documents to be displayed as summaries replacing the second summaries. In this display method, however, the first summaries cannot be discriminated from the second summaries.

Alternatively, the first and second summaries extracted from the same document may be displayed in combination. According to this display method, however, even if the display order is determined according to the order in which scores are calculated when documents are retrieved or the order in which scores are calculated when the second summaries are extracted, the first or second summaries are not displayed in the order of the scores. This makes it difficult for the user to use this method.

In question answering retrieval, the second summaries may not be found because of, for example, the following factors: (1) the question sentence is only formed of keywords, (2) the question sentence is ambiguous, (3) a determination rule for question types is not adequate, and (4) an extraction rule for descriptions corresponding to answers matching a question type is not adequate. In this embodiment, however, document retrieval results including a list of the first summaries acquired by using the keyword retrieval technique are presented to the user. Even if, therefore, no second summaries can be found, the user can easily access information for which they are searching from the list of the first summaries.

The above embodiment is based on the assumption that the display device 3, the input device 4, and the processing section (the interface 21, retrieval device 22, and excerption device 23) which performs, for example, document retrieval in accordance with a document retrieval request input from the input device 4 exist in the same computer system. However, the display device 3 and the input device 4, for example, may be provided in a client terminal, and the above processing section, for example, may be provided in a retrieval server computer connected to the client terminal through a network. In addition, the original-document database 201, for example, may be provided in a database server computer connected to the retrieval server computer through a network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

INDUSTRIAL APPLICABILITY

According to the present invention, since a list of the first summaries extracted from documents retrieved by the keyword retrieval technique using keywords extracted from a question and a list of the second summaries corresponding to answers to the question which are extracted from the retrieved documents by using the question answering retrieval technique can be presented to the user, the user can easily access information for which they are searching.

The invention claimed is:

1. A question answering document retrieval system, implemented by a computer system, which executes document retrieval in accordance with a retrieval request in question form, comprising:

retrieval means for retrieving associated documents on the basis of a keyword extracted from a question serving as a retrieval request in question form from a user, the retrieval means extracting descriptions associated with the keyword and contained in the retrieved documents as first summaries, thereby acquiring document retrieval results including a list of the extracted first summaries;

question type determination means for determining a question type of the question by analyzing a semantic role of the question;

summary extraction means for extracting descriptions corresponding to answers matching the determined question type as second summaries from original-document data which forms documents indicated by the document retrieval results, the original-document data being included in original-document data stored in an original-document database and forming each document as a retrieval target, the summary extraction means acquiring a list of the extracted second summaries; and an interface configured to display the document retrieval results and the list of the second summaries, as answers to the retrieval request from the user, on a display device which can be used by the user, the document retrieval results including the list of the first summaries, wherein:

the retrieval means includes first score assignment means for calculating a first score representing a degree of relevance with a keyword extracted from the question for each document when associated documents are retrieved on the basis of the keyword, selection means for selecting associated documents on the basis of the first scores calculated by the first score assignment means, and first extraction means for extracting the first summaries from the documents selected by the selection means; and the summary extraction means includes second score assignment means for calculating a second score representing a degree of relevance with a keyword extracted from the question for each candidate for a description corresponding to an answer matching the determined question type, and second extraction means for extracting corresponding descriptions as the second summaries on the basis of the second scores calculated by the second score assignment means.

2. The question answering document retrieval system according to claim 1, wherein the interface includes a display order decision unit configured to decide a display order of the first summaries extracted by the first extraction means on the basis of the first scores corresponding to the documents containing the first summaries which are calculated by the first score assignment means, and decide a display order of the second summaries extracted by the second extraction means on the basis of the second scores corresponding to the second summaries which are calculated by the second score assignment means.

3. The question answering document retrieval system according to claim 1, wherein:

the selection means selects associated documents on the basis of the first scores calculated by the first score assignment means in the order of the scores;

the first extraction means transfers, to the interface, document retrieval results including the list of the first summaries extracted from the documents selected in the order of the scores with the first summaries in the list being arranged in the order of the corresponding scores; and the second extraction means transfers, to the interface, the list of the second summaries extracted on the basis of the second scores calculated by the second score assignment means with the second summaries in the list being arranged in the order of the corresponding scores.

4. The question answering document retrieval system according to claim 1, further comprising a pattern determination dictionary which stores, for each predetermined question type, sentence structure information representing a sentence structure unique to the question type, and wherein:

the summary extraction means includes means for extracting descriptions having a sentence structure unique to the determined question type as candidates for descriptions corresponding to answers matching the question type by pattern matching between the original-document data forming each document indicated by the document retrieval result and document structure information which is stored in the pattern determination dictionary and is unique to the determined question type; and the second score assignment means calculates a score representing a degree of relevance with a keyword extracted from the question for each of the extracted candidates.

5. A method for question answering document retrieval which retrieves documents in accordance with a retrieval request in question form, comprising:

retrieving associated documents on the basis of a keyword extracted from a question serving as a retrieval request in question form from a user;

extracting descriptions associated with the keyword and contained in retrieved documents as first summaries;

acquiring document retrieval results including a list of the extracted first summaries;

determining a question type of the question by analyzing a semantic role of the question;

extracting descriptions corresponding to answers matching the determined question type as second summaries from original-document data, of original-document data stored in an original-document database and forming each document as a retrieval target, which form documents indicated by the document retrieval results; and displaying the document retrieval results and the list of the extracted second summaries, as answers to the retrieval request from the user, on a display device which can be used by the user, the document retrieval results including the list of the acquired first summaries, wherein:

the retrieving includes calculating a first score representing a degree of relevance with a keyword extracted from the question for each document when associated documents are retrieved on the basis of the keyword, and selecting, as retrieved documents, the associated documents on the basis of the calculated first scores; and the extracting as the second summaries includes calculating a second score representing a degree of relevance with a keyword extracted from the question for each candidate for a description corresponding to an answer matching the determined question type, and extracting a corresponding description as the second summary on the basis of the calculated second score.

6. The method according to claim 5, wherein the displaying includes deciding a display order of the extracted first summaries on the basis of the first scores corresponding to the documents containing the first summaries, and deciding a display order of the extracted second summaries on the basis of the second scores corresponding to the second summaries.

7. A computer program product tangibly embodied in a computer-readable storage medium for question answering document retrieval used to retrieve documents in accordance with a retrieval request in question form, comprising:

computer-readable code means for retrieving associated documents on the basis of a keyword extracted from a question serving as a retrieval request in question form from a user;

computer-readable code means for extracting descriptions associated with the keyword and contained in retrieved documents as first summaries;

computer-readable code means for acquiring document retrieval results including a list of the extracted first summaries;

computer-readable code means for determining a question type of the question by analyzing a semantic role of the question;

computer-readable code means for extracting descriptions corresponding to answers matching the determined question type as second summaries from original-document data which forms each document indicated by the document retrieval results, the original-document data being included in original-document data stored in an original-document database and forming each document as a retrieval target; and computer-readable code means for displaying the document retrieval results and the list of the extracted second summaries, as answers to the retrieval request from the user, on a display device which can be used by the user, the document retrieval results including the list of the acquired first summaries, wherein:

the retrieving includes calculating a first score representing a decree of relevance with a keyword extracted from the guest ion for each document when associated documents are retrieved on the basis of the keyword, and selecting, as retrieved documents, the associated documents on the basis of the calculated first scores; and the extracting as the second summaries includes calculating a second score representing a degree of relevance with a keyword extracted from the question for each candidate for a description corresponding to an answer matching the determined question type, and extracting a corresponding description as the second summary on the basis of the calculated second score.

* * * * *

UNITED STATES PATENT AND TRADEMARK OFFICE
CERTIFICATE OF CORRECTION

PATENT NO. : 7,587,420 B2
APPLICATION NO. : 10/572458
DATED : September 8, 2009
INVENTOR(S) : Kobayashi et al.

It is certified that error appears in the above-identified patent and that said Letters Patent is hereby corrected as shown below:

Claim 7, column 14, line 30, change "decree" to --degree--.

Claim 7, column 14, line 31, change "guest ion" to --question--.

Signed and Sealed this

Third Day of November, 2009

David J. Kappos
*Director of the United States Patent and Trademark Office*